United States Patent
Guha et al.

(10) Patent No.: US 8,631,103 B1
(45) Date of Patent: Jan. 14, 2014

(54) WEB-BASED ADMINISTRATION OF REMOTE COMPUTING ENVIRONMENTS VIA SIGNALS SENT VIA THE INTERNET

(75) Inventors: Saugata Guha, Fremont, CA (US); Carleton Miyamoto, Santa Clara, CA (US); Jagadish Bandhole, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1408 days.

(21) Appl. No.: 09/860,620

(22) Filed: May 18, 2001

Related U.S. Application Data

(60) Provisional application No. 60/247,119, filed on Nov. 10, 2000.

(51) Int. Cl.
G06F 13/00 (2006.01)

(52) U.S. Cl.
USPC .......................................................... 709/223

(58) Field of Classification Search
USPC ........... 709/200, 222, 223, 201; 713/1, 2, 100
See application file for complete search history.

(56) References Cited

U.S. PATENT DOCUMENTS

| | | | |
|---|---|---|---|
| 4,925,311 A | 5/1990 | Neches et al. ................. | 364/200 |
| 5,191,611 A | 3/1993 | Lang ................................ | 380/25 |
| 5,394,522 A | 2/1995 | Sanchez-Frank et al. .... | 395/159 |
| 5,410,707 A | 4/1995 | Bell .................................. | 713/2 |
| 5,418,918 A | 5/1995 | Vander Kamp et al. .......... | 713/2 |
| 5,421,009 A | 5/1995 | Platt | |
| 5,452,454 A | 9/1995 | Basu ................................. | 713/2 |
| 5,463,766 A | 10/1995 | Schieve et al. .................... | 713/2 |
| 5,479,599 A | 12/1995 | Rockwell et al. ............. | 715/837 |
| 5,515,524 A | 5/1996 | Lynch et al. ................... | 395/500 |
| 5,555,370 A | 9/1996 | Li et al. .......................... | 395/161 |
| 5,577,210 A | 11/1996 | Abdous et al. ................ | 709/219 |
| 5,668,995 A | 9/1997 | Bhat .............................. | 395/674 |
| 5,694,600 A | 12/1997 | Khenson et al. .................. | 713/2 |
| 5,727,213 A | 3/1998 | Vander Kamp et al. .......... | 713/2 |
| 5,752,041 A | 5/1998 | Fosdick | |
| 5,802,290 A | 9/1998 | Casselman ..................... | 709/201 |
| 5,842,011 A | 11/1998 | Basu ................................. | 713/2 |
| 5,864,699 A | 1/1999 | Merryman | |

(Continued)

FOREIGN PATENT DOCUMENTS

| | | |
|---|---|---|
| EP | 745929 A1 | 12/1996 |
| EP | 841616 A2 | 5/1998 |

OTHER PUBLICATIONS

Sekaran Nanja, "User Interface for Dynamic Computing Environment Using Allocatable Resources," Filed Sep. 15, 2000, U.S. Appl. No. 09/663,252, 27 pages of specification (including claims and abstract), and 5 sheets of drawings.

(Continued)

Primary Examiner — Robert B Harrell
(74) Attorney, Agent, or Firm — Campbell Stephenson LLP

(57) ABSTRACT

A solution for remotely administering dynamic computing environments is provided. A list of administrative actions and computing devices are displayed on a user interface. The user then can select an administrative action to be performed on any number of the computing devices in the list. Once selected, a signal is sent to the remote computing environment indicating the administrative action to be performed on the selected computing devices. The administrative action is then performed on the selected computing devices.

32 Claims, 4 Drawing Sheets

(56) References Cited

U.S. PATENT DOCUMENTS

| | | | |
|---|---|---|---|
| 5,894,571 A | 4/1999 | O'Connor | 395/652 |
| 5,942,738 A | 8/1999 | Cesaire et al. | 235/380 |
| 5,948,101 A | 9/1999 | David et al. | 713/2 |
| 5,974,443 A | 10/1999 | Jeske | 709/202 |
| 5,974,547 A | 10/1999 | Klimenko | 713/2 |
| 6,002,871 A | 12/1999 | Duggan et al. | 717/135 |
| 6,009,507 A | 12/1999 | Brooks et al. | 712/28 |
| 6,058,113 A | 5/2000 | Chang | 370/390 |
| 6,081,846 A | 6/2000 | Hyder et al. | 709/250 |
| 6,081,864 A | 6/2000 | Lowe et al. | 710/129 |
| 6,085,318 A | 7/2000 | Vander Kamp et al. | 713/1 |
| 6,092,189 A | 7/2000 | Fisher et al. | 713/1 |
| 6,098,067 A * | 8/2000 | Erickson | 707/10 |
| 6,101,601 A | 8/2000 | Matthews et al. | 713/2 |
| 6,122,738 A | 9/2000 | Millard | 713/187 |
| 6,182,123 B1 | 1/2001 | Filepp et al. | 709/217 |
| 6,189,100 B1 | 2/2001 | Barr et al. | 713/182 |
| 6,192,518 B1 | 2/2001 | Neal | |
| 6,202,091 B1 | 3/2001 | Godse | 709/222 |
| 6,230,200 B1 | 5/2001 | Forecast et al. | 709/226 |
| 6,259,448 B1 | 7/2001 | McNally et al. | 345/348 |
| 6,262,726 B1 | 7/2001 | Stedman et al. | 345/333 |
| 6,266,678 B1 | 7/2001 | McDevitt et al. | 707/201 |
| 6,282,709 B1 | 8/2001 | Reha | |
| 6,298,443 B1 | 10/2001 | Colligan et al. | 713/200 |
| 6,304,965 B1 | 10/2001 | Rickey | 713/2 |
| 6,308,238 B1 | 10/2001 | Smith et al. | 710/310 |
| 6,370,560 B1 | 4/2002 | Robertazzi et al. | 718/105 |
| 6,374,336 B1 | 4/2002 | Peters et al. | 711/167 |
| 6,393,557 B1 | 5/2002 | Guthridge et al. | 713/1 |
| 6,421,777 B1 | 7/2002 | Pierre-Louis et al. | 713/2 |
| 6,446,126 B1 | 9/2002 | Huang et al. | 709/226 |
| 6,463,530 B1 | 10/2002 | Sposato | 713/2 |
| 6,466,972 B1 * | 10/2002 | Paul et al. | 709/222 |
| 6,466,978 B1 | 10/2002 | Mukherjee et al. | 709/216 |
| 6,477,624 B1 | 11/2002 | Kedem et al. | 711/147 |
| 6,490,564 B1 | 12/2002 | Dodrill et al. | 704/275 |
| 6,493,679 B1 | 12/2002 | Rappaport et al. | 705/29 |
| 6,498,791 B2 | 12/2002 | Pickett et al. | 370/353 |
| 6,512,526 B1 | 1/2003 | McGlothlin et al. | 345/762 |
| 6,539,456 B2 | 3/2003 | Stewart | 711/113 |
| 6,543,047 B1 | 4/2003 | Vrhel, Jr. et al. | 717/121 |
| 6,550,006 B1 | 4/2003 | Khanna | 713/2 |
| 6,560,606 B1 | 5/2003 | Young | 707/100 |
| 6,564,112 B1 | 5/2003 | Factor | 700/97 |
| 6,577,229 B1 | 6/2003 | Bonneau et al. | 340/10.41 |
| 6,578,076 B1 | 6/2003 | Putzolu | |
| 6,578,141 B2 | 6/2003 | Kelley et al. | 713/1 |
| 6,598,131 B2 | 7/2003 | Kedem et al. | 711/147 |
| 6,601,095 B1 | 7/2003 | Duffield et al. | 709/222 |
| 6,601,166 B1 | 7/2003 | Avyar et al. | 713/2 |
| 6,604,238 B1 | 8/2003 | Lim | |
| 6,615,365 B1 | 9/2003 | Jenevein et al. | 714/6 |
| 6,633,916 B2 | 10/2003 | Kauffman | 709/229 |
| 6,662,267 B2 | 12/2003 | Stewart | 711/113 |
| 6,668,327 B1 | 12/2003 | Prabandham et al. | 713/2 |
| 6,684,327 B1 | 1/2004 | Anand et al. | 713/2 |
| 6,711,688 B1 | 3/2004 | Hubacher et al. | 713/201 |
| 6,742,028 B1 * | 5/2004 | Wang et al. | 709/223 |
| 6,748,525 B1 | 6/2004 | Hubacher et al. | 713/1 |
| 6,751,662 B1 | 6/2004 | Natarajan et al. | |
| 6,757,837 B1 | 6/2004 | Platt et al. | 714/4 |
| 6,768,901 B1 | 7/2004 | Osborn et al. | 455/230 |
| 6,802,062 B1 | 10/2004 | Oyamada et al. | 718/1 |
| 6,804,774 B1 | 10/2004 | Larvoire et al. | 713/2 |
| 6,810,478 B1 | 10/2004 | Anand et al. | 713/2 |
| 7,058,700 B1 | 6/2006 | Casalaina | 709/220 |
| 7,065,637 B1 | 6/2006 | Nanja | 713/1 |
| 7,082,521 B1 | 7/2006 | Nanja | 713/1 |
| 2001/0011304 A1 | 8/2001 | Wesinger, Jr. et al. | 709/227 |
| 2002/0069369 A1 | 6/2002 | Tremain | 713/201 |
| 2002/0172222 A1 | 11/2002 | Ullmann et al. | |
| 2003/0009552 A1 | 1/2003 | Benfield et al. | |
| 2003/0046529 A1 | 3/2003 | Loison et al. | 713/2 |
| 2004/0054780 A1 | 3/2004 | Romero | |
| 2005/0021723 A1 | 1/2005 | Saperia | |
| 2005/0188088 A1 | 8/2005 | Fellenstein et al. | |

OTHER PUBLICATIONS

Sekaran Nanja, "System for Configuration of Dynamic Computing Environments Using a Visual Interface," Filed Sep. 15, 2000, U.S. Appl. No. 09/662,990, 23 pages of specification (including claims and abstract), and 2 sheets of drawings.

Workflow Template, Developing a WFT Workflow System, Copyright © 1998, Template Software, Inc.

Workflow Template, Using the WFT Development Environment, Copyright © 1998, Template Software, Inc.

Debenham, Clive, "Taos: The Operating System," May 29, 1995, Tantric Technologies, Newsgroups: comp.parallel.

Application Developer's Training Course, SNAP 8.0 Training Participant Guide, Module 7, Copyright © 1997, Template Software, Inc., pp. 7-1 through 7-34.

Workflow Template, Developing a WFT Workflow System, Copyright © 1998, Template Software, Inc., 352 pages.

Workflow Template, Using the WFT Development Environment, Copyright © 1998, Template Software, Inc., 412 pages.

Web Component, Using the Web Component, Copyright © 1997, Template Software, Inc.

Simon—"Computer System Built to Order"—Nov. 25, 1996—Newsgroups: demon.adverts, midlands.adverts, sanet.adverts, solent.forsale, uk.adverts.computer, unet.adverts, uk.adverts.other, dungeon.forsale.

Henry, Mike, Intel Corporation, *Extending PXE to Mobile Platforms*, Jun. 1998, pp. 1-4, http://www.intel.com/update/archive/psn/psn06985.pdf.

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf.

International Search Report as mailed from the PCT on Aug. 13, 2004 for WO Application (PCT/US03/28820; Filed Sep. 10, 2003), 3 pages).

* cited by examiner

WEB-BASED ADMINISTRATION OF REMOTE COMPUTING ENVIRONMENTS VIA SIGNALS SENT VIA THE INTERNET

CROSS-REFERENCES TO RELATED APPLICATIONS

The present application claims the benefit of priority under 35 U.S.C. §119 from the provisional patent application, U.S. Provisional Patent Application No. 60/247,119 filed on Nov. 10, 2000, which is hereby incorporated by reference, as if set forth in full in this document, for all purposes.

This application is related to U.S. Non-Provisional Patent Application entitled "User Interface for Dynamic Computing Environment Using Allocateable Resources" Ser. No. 09/663,252 filed on Sep. 15, 2000, page no. 1-27, FIGS. 1-5, U.S. Non-Provisional Patent Application entitled "System for Configuration of Dynamic Computing Environments Using a Visual Interface" Ser. No. 09/662,990 filed on Sep. 15, 2000, page no. 1-23, FIGS. 1-2, and U.S. Non-Provisional patent application Ser. No. 09/861,483 filed on May 17, 2001 entitled "Dynamic Computing Environment Using Remotely Allocable Resources", which are hereby incorporated by reference, as if set forth in full in this document, for all purposes.

BACKGROUND OF THE INVENTION

The present invention relates in general to digital processing, and more specifically, to a service allowing dynamic computer environments to be remotely managed using techniques that are agnostic of hardware and software vendors.

Today's network approach provides computing resources and digital content, or information, to users on a massive scale. The use of networked computers, and other processing devices, have taken the tedium out of day-to-day activities in almost every area of contemporary life such as in education, commerce, business, and entertainment. However, the installation, day-to-day maintenance and administration of these networks have become tedious tasks that are not cost-effective.

For instance, a web search engine site, visited by millions of users each day, may use a network of several hundreds of server computers. The site needs to update content and software applications in its servers at regular intervals. These updates may trigger reboots of the system or require updates of the operating system to match newer versions of the applications. In addition, these "server farms" may not be hosted conveniently in the confines of the search engine's site. They may be hosted in a data center where physical access may be a premium and an unwanted intrusion. Therefore, a service to remotely administer the search engine's servers is desired.

In a different example of a "distributed content delivery system" serving a multitude of web sites, the server farm is parceled into smaller farms and located in far-flung geographical areas. To remain scalable, these services need "regular" additional installations to their server farms in addition to keeping up with revisions or patches to existing servers or other hardware and operating systems running on these servers. To meet the demands of several millions of customers a day, service providers need to reduce the average "downtime" of individual servers. To achieve these goals with the conflicting constraints that go along with them, service providers desire a robust solution that will reduce the cost and complexity of their routine maintenance effort.

SUMMARY OF THE INVENTION

A system and method for providing a solution for remotely administering dynamic computing environments is provided by virtue of the present invention. In one embodiment of the invention, a list of administrative actions and computing devices are displayed on a user interface. The user then can select an administrative action to be performed on any number of the computing devices in the list. Once selected, a signal is sent to the remote computing environment indicating the administrative action to be performed on the selected computing devices. The administrative action is then performed on the selected computing devices.

In one embodiment, the administrative actions can be performed by receiving a signal indicating the administrative action to be performed at a computing device. The computing device then locates a server, which executes a script. The script assigns an Internet Protocol ("IP") address, retrieves new information regarding its configuration from the computing device, and updates the internal tables of the server with the new information. An administrative action can then be performed on the computing device. The process can end at this point; however, further administrative actions can be performed on the computing device. In this case, the computing device will again locate the server, which will verify the identity of the computing device and run the script. The script will then perform the additional administrative actions.

In an embodiment of a data signal embodied in a carrier wave, the signal is generated by a method and includes instructions for performing an administrative action on a remote computing device in a remote dynamic computing environment. The method comprising the steps of: one or more instructions for sending a signal indicating the administrative action to be performed on the remote computing device; one or more instructions for initializing the remote computing device in the remote dynamic computing environment; and one or more instructions for performing the administrative action on the remote computing device.

In an embodiment of a computer readable medium, a computer system includes instructions for performing an administrative action on a remote computing device in a remote dynamic computing environment. The computer-readable media comprising: one or more instructions for sending a signal indicating the administrative action to be performed on the remote computing device; one or more instructions for initializing the remote computing device in the remote dynamic computing environment; and one or more instructions for performing the administrative action on the remote computing device.

A further understanding of the nature and advantages of the invention herein may be realized by reference of the remaining portions in the specifications and the attached drawings.

DESCRIPTION OF THE SPECIFIC EMBODIMENTS

Figure 1:
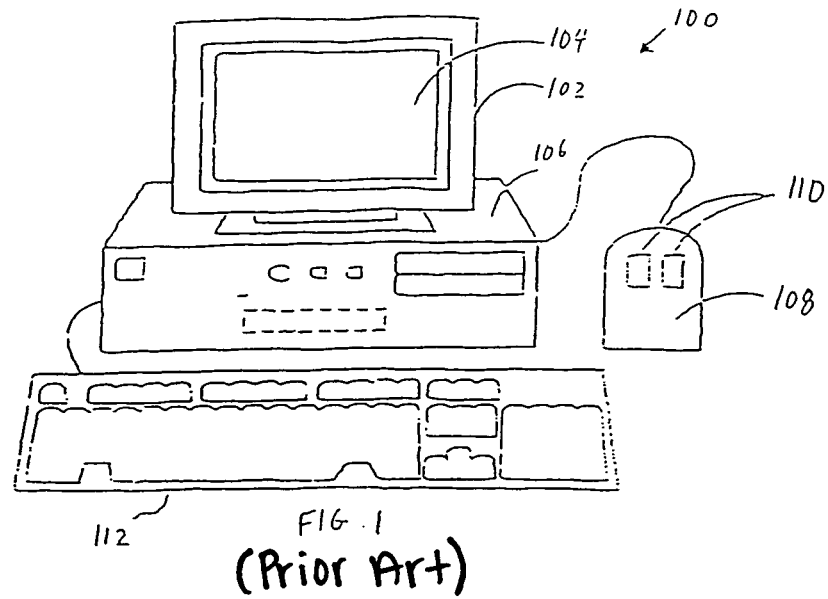
FIG. 1 is an illustration of a computer system suitable for use with the present invention.

Detailed descriptions of the embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

An embodiment of the present invention allows fast, efficient selection and configuration of processing networks, which can then be accessed and managed remotely. The processing network is referred to as a system including "resources." A system resource is any hardware, software or communication components in the system. For example, discrete hardware devices include processing platforms such as computers or processors, mobile/laptop computers, embedded computing devices, hand-held computers, personal digital assistants, point-of-sale terminals, smart-card devices, storage devices, data transmission and routing hardware etc., without limitation. Additionally, computer peripherals such as monitors, input/output devices, disk drives, manufacturing devices, or any device capable of responding to, handling, transferring or interacting with digital data are also resources. Software, or any other form of instruction, is executed by processors in the system and is also a type of resource. Finally, communication resources are also part of the system such as a digital network's hardware including the network's configuration and topology, where control of the network is provided by software and/or hardware. Additionally, the network may be based on wired connections or wireless connections. For instance, the network hardware and software may be based on Bluetooth wireless standards.

For example, a processing network of a general consumer might include a PDA and a cell phone, each connected by wireless channels to a single personal computer, which in turn is connected to an email server at a remote location through the Internet. As another example, a processing network might include a personal computer running Microsoft Windows 98 operating system, a lap-top computer running Linux operating system, and another personal computer running Windows NT operating system along with router and firewall software, wherein all three computers are connected using a local Ethernet hub, and the router software routes connections to the Internet.

According to an embodiment of the present invention, the resources for such a processing network are fully selectable and allocable by a system architect. In a specific embodiment, a primary company, Jareva Technologies, Inc.® provides proprietary technology to a system architect for designing a system by allocating resources and specifying how the resources are to be used. The system architect can be an individual, corporate entity, etc. The system is referred to as an "environment"—or more specifically as a "computing environment" and the primary provider of such an environment is referred to as an Environment Service Provider (ESP). A typical system architect is referred to as the "customer." The primary provider obtains revenue for providing the resources and the tools to easily select, allocate, configure and run the environment.

The specific embodiment of the present invention allows fast allocation and configuration of resources such that different environments can be created from the same resources within minutes, or even seconds. This allows "time sharing" of overall resources so that a first environment can be "alive" or operative for a time period defined by the system architect (e.g., daily two-hour slot), followed by second, third and fourth environments being instantly created for the next four hours for three different customers, and so on. After a time period expires, such environments might either manually or automatically de-allocate such resources. Since these "computing environments" can be dynamically configured and re-configured out of the same set of resources, these will also be referred to as "Dynamic Computing Environments".

A specific embodiment allows customers to create a computing environment from a remotely-accessible user interface such as a web page on the Internet. Thus, the customer can create, modify and operate the environment from anywhere in the world. Since the resources, in turn, can communicate over networks, including the Internet, this approach eliminates the cost of shipping hardware and software. Hardware and software designers, programmers, testers or other personnel using an environment according to the embodiment of the present invention can, similarly, be located anywhere in the world such that labor costs are optimized.

The creation of dynamic computing environments ("DCE") is automatic. For example, a customer can request a web-site simulator using twelve web-page servers on a Microsoft® NT platform, two disk arrays at a specific bandwidth and storage capacity, two caching servers and 200 clients running Netscape Navigator™ under Microsoft Windows® 2000 using Pentium III™ processors at under 800 MHz. Such an environment is created and destroyed, and even re-created automatically, without human intervention each time. Unlike the conventional computing infrastructure, according to an embodiment of the present invention there is no need to physically couple or de-couple, each physical machine or resource to each other upon adding or removing such resources. There is no need to set-up Internet Protocol (IP) addresses or other network settings, or install operating systems and associated application programs on one or more physical machines. All such activities on a DCE can be performed automatically without user intervention.

According to an embodiment of the present invention, the DCE is a virtual computing system including a network comprising a number of distinct types of machines and a network connecting them. For example, a system architect might require a DCE to include a Sun Sparc running a certain version of Solaris O/S coupled to a Linux machine. An embodiment of the present invention enables the separation of the activity of designing a DCE, from the activity of actually creating the DCE. Designing a DCE includes choosing the specific hardware, choosing the operating systems or other software, and choosing the specific interconnections, etc. Creating a DCE includes allocating the resources, installing the operating systems and other software, etc. Furthermore, an embodiment of the present invention automates the process of creating the DCE. A DCE for which resources have not been allocated yet will also be referred to as a virtual computing environment. Similarly, a computing device (or a subnet) that is part of a DCE will also be referred to as a virtual computing device (or a virtual subnet), if the required resources for the computing device (or the subnet) have not been allocated yet.

An embodiment of the present invention provides a framework that enables configuring, provisioning, accessing and managing DCEs remotely. Configuring a DCE involves choosing the resources and their interconnections. An embodiment of the present invention supports operations for making such design choices through appropriate programmable interfaces. The interfaces can be used interactively through a graphical user interface such as a web page or non-interactively through a program script. Provisioning a DCE involves allocation of physical resources required for a DCE to function. An embodiment of the present invention manages the physical resources needed for provisioning DCEs and supports operations for allocating/de-allocating these resources. Accessing a DCE involves accessing one or more devices and/or sub-networks within the DCE. An embodiment of the present invention supports operations for accessing the components of a DCE. For instance, when a user needs to copy data from a specific computer to a backup storage device, operations involving "read" access to the computer and its local storage, "write" access to the storage device, and access to the network for transmitting the data will be used by an embodiment of the present invention to meet the user's needs. Managing a DCE involves managing the components of a DCE, such as a personal computer, a network router, etc.

In one embodiment of the present invention, a system provide a framework for administering DCEs is implemented as a distributed system consisting of different software programs running on different computers and networking hardware. Administering DCEs, as described herein refers to the configuring, provisioning, accessing, and managing of dynamic computing environments. In a further embodiment, an embodiment of the present invention permits "virtual" hosting of dynamic computing environments. As used herein, the term "virtual" specifies that neither the requisite devices nor the network need to be physically accessible to users. Further, in accordance with this embodiment, the hosting process may be initiated or terminated by users at will, from any geographic location. Thus the administrative framework allows users to remotely configure, provision, access, and manage DCEs.

A further understanding of embodiments of the present invention will be gained with reference to the diagrams and the descriptions that follow.

FIG. 1 shows a computer system 100 suitable for use to provide a system in accordance with an embodiment of the present invention. The computer system 100 includes a display 102 having a display screen 104. A cabinet 106 houses standard computer components (not shown) such as a disk drive, CD-ROM drive, display adapter, network card, random access memory (RAM), central processing unit (CPU) and other components, subsystems and devices. User input devices such as a mouse 108 having buttons 110, and a keyboard 112 are shown. Other user input devices such as a trackball, touch-screen, digitizing tablet, etc., can be used. In general, the computer system 100 is illustrative of one type of computer system, such as a desktop computer, suitable for use with the present invention. Computers can be configured with many different hardware components and can be made in many dimensions and styles (e.g., laptop, palmtop, server, workstation and mainframe). Thus, any hardware platform suitable for performing the processing described herein is suitable for use with an embodiment of the present invention.

Figure 2:
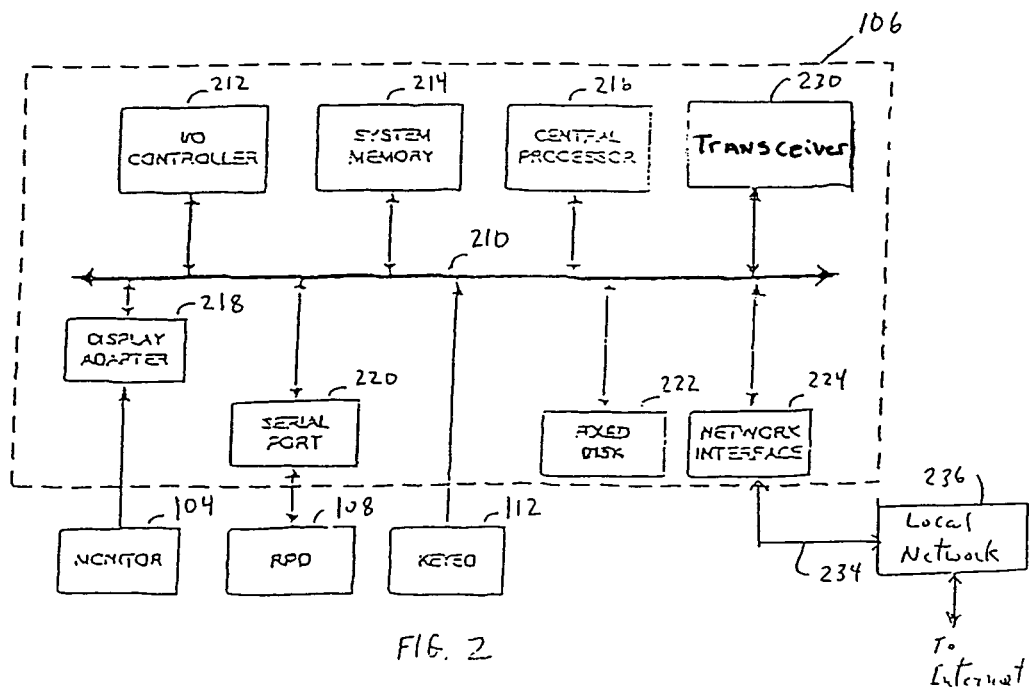
FIG. 2 shows subsystems in the computer system of FIG. 1.

FIG. 2 illustrates subsystems found in the computer system 100. Subsystems within box 106 are directly interfaced to an internal bus 210. The subsystems include input/output (I/O) controller 212, system random access memory (RAM) 214, central processing unit (CPU) 216, display adapter 218, serial port 220, fixed disk 222, network interface adapter 224 and transceiver 230. The use of the bus allows each of the subsystems to transfer data among the subsystems and, most importantly, with the CPU. External devices can communicate with the CPU or other subsystems via the bus by interfacing with a subsystem on the bus. The monitor 104 connects to the bus through the display adapter 218. A relative pointing device (RPD) such as a mouse 108 connects through the serial port. Some devices such as keyboard 112 can communicate with the CPU by direct means without using the main data bus as, for example, via an interrupt controller and associated registers (not shown). The transceiver 230 can be coupled with a satellite system, cable system, telephone lines or any other system suitable for propagating information. The transceiver can include or be coupled with a communication interface, which can be coupled with bus 210.

FIG. 2 is illustrative of one suitable configuration for providing a system in accordance with an embodiment of the present invention. Subsystems, components or devices other than those shown in FIG. 2 can be added without deviating from the scope of the invention. A suitable computer system can also be achieved without using all of the subsystems shown in FIG. 2. Other subsystems such as a CD-ROM drive, graphics accelerator, etc., can be included in the configuration without affecting the performance of the system included in an embodiment of the present invention.

An embodiment of the invention is related to the use of apparatus, such as the computer system 100, for implementing a service for comprehensive, vendor-agnostic remote management of dynamic computing environments. According to one embodiment of the invention, remote management of a dynamic computing environment is provided by the computer system 100 in response to the processor 216 executing one or more sequences of one or more instructions contained in the system memory 214. Such instructions may be read into memory 214 from a computer-readable medium, such as a fixed disk 222. Execution of the sequences of instructions contained in the memory 214 causes the processor to perform the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to the processor 214 for execution. Such media can take many forms, including, but not limited to, non-volatile media, volatile media and transmission media. Non-volatile media include, for example, optical or magnetic disks, such as a fixed disk 222. Volatile media include dynamic memory, such as memory 214. Transmission media include coaxial cables, copper wire and fiber optics, including the wires that comprise the bus 210. Transmission media can also take the form of acoustic or light waves, such as those generated during radio frequency (RF) and infra-red (IR) data communications. Common forms of computer-readable media include, for example, a floppy disk, a flexible disk, a hard disk, magnetic tape, any other magnetic medium, a CD-ROM disk, DVD, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 216 for execution. For example, the instructions may initially be borne on a magnetic disk of a remote computer. The remote computer can load the instructions into its dynamic memory and send the instructions over a telephone line using a modem. A modem local to the computer system 100 can receive the data on the telephone line and use an infrared transmitter to convert the data to an infrared signal. An infrared detector coupled with the bus 210 can receive the data carried in the infrared signal and place the data on the bus. The bus carries the data to the memory 214, from which the processor retrieves and executes the instructions. The instructions received by the memory can optionally be stored on the fixed disk 222 either before or after execution by the processor.

The computer system 100 also includes a network interface 224 or communication interface coupled to the bus 210. The network interface or communication interface provides a two-way data communication coupling with a network link 234 that is connected to a local network 236. For example, the network interface or communication interface can be an integrated services digital network (ISDN) card or a modem to provide a data communication connection to a corresponding type of telephone line. As another example, the network interface or communication interface can be a local area network (LAN) card to provide a data communication connection to a compatible LAN. Wireless links can also be implemented. In any such implementation, the network interface 224 or the communication interface and transceiver 230 send and receive electrical, electromagnetic or optical signals that carry digital data streams representing various types of information.

The network link 234 typically provides data communication through one or more networks to other data devices. For example, the network link can provide a connection through the local network 236 to a host computer or to data equipment operated by an Internet Service Provider (ISP). The ISP in turn provides data communication services through the worldwide packet data communication network, now commonly referred to as the "Internet." The local network and the Internet both use electrical, electromagnetic or optical signals that carry digital data streams. The signals that propagate through the various networks and the signals on the network link and that propagate through the network interface 224, and the signals that propagate through the transceiver 230, which carry the digital data to and from computer system 100, are exemplary forms of carrier waves transporting the information.

The computer system 100 can send messages and receive data, including user commands, video data, audio data and program codes through the network(s), the network link 234, and the network interface 224. In the Internet example, a server might transmit a requested code for an application program through the ISP, Internet, local network 236 and network interface 224. Instead of or in addition to transmission via the Internet, the computer system 100 can send and receive data via the transceiver 230 and a wireless system, satellite system, cable system, telephone lines or any other system suitable for propagating information between the computer system and an information distribution system. In accordance with one embodiment, one such downloaded application provides for a MPEG video cut and paste operation as described herein. The processor 216 can execute the received code as the code is received, and/or store the code on the fixed disk 222, or other non-volatile storage for later execution. In this manner, the computer system can obtain an application code in the form of a carrier wave.

One embodiment of the present invention relates to a service for remotely administering a computing device in a dynamic computing environment. A user located in a remote location can be presented with a user interface including a list of administrative actions and computing devices. An administrative action is selected to be performed on one or more computing devices and sent to the dynamic computing environment. The selected computing devices are then initialized or re-initialized in the dynamic computing environment. The administrative action can then be performed on the computing device.

Figure 3:
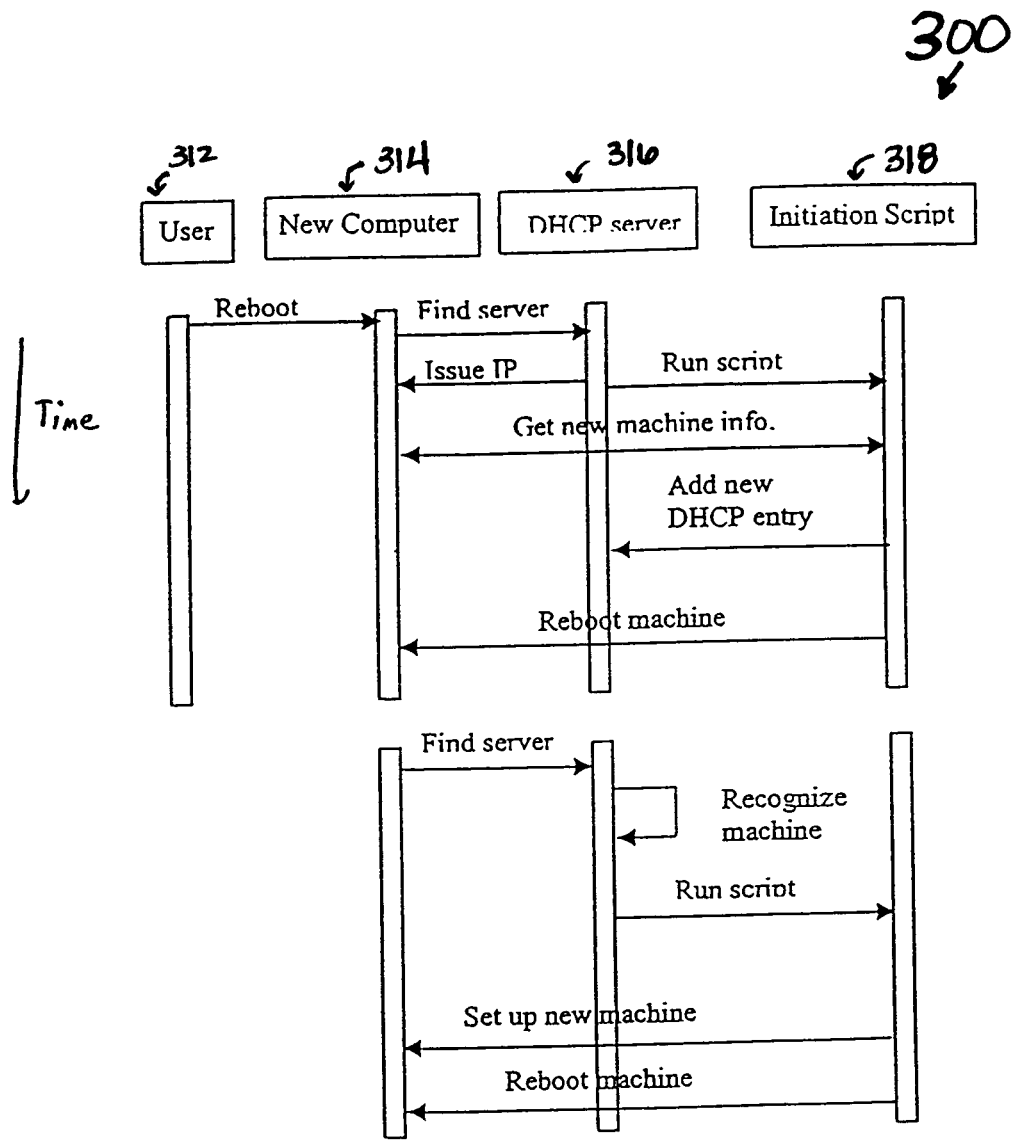
FIG. 3 illustrates a method of remotely administering one or more computing environment according to one embodiment of the invention.

FIG. 3 illustrates a system 300 for remotely administering a dynamic computing environment according to one embodiment of the invention. As shown, system 300 includes a user interface 312, computing device 314, server 316, and script 318.

User interface 312 can be any interface enabling communication with the dynamic computing environment. In a specific embodiment, a user interface can be a web page that includes a list of administrative actions and a list of one or more computing devices. The user interface can then be located on a web-enabled device such as a personal computer, hand-held computing device, or any other device capable of connecting to the Internet. The interface allows a user to select one or more of the computing devices and an operation from the list of administrative actions to be performed on the selected computers. For example, a user could select a HyperText Protocol Transfer (HTTP) link to invoke an administrative action on a computer. Examples of possible administrative actions include: the remote powering down of one or more computers, the remote booting or rebooting of one or more computers, the remote installation or re-installation of an operating system of one or more computers, the changing of the operation system and/or file system of one or more computers, and the remote configuring of one or more computers to be part of the dynamic computing environment. These administrative actions are performed on a remote computing environment, such as a dynamic computing environment. In another embodiment, a user interface can be used that was provided in the Patent Application entitled "User Interface for Dynamic Computing Environment using Allocateable Resources" Ser. No. 09/663,252 filed on Sep. 15, 2000, page no. 1-27, FIGS. 1-5; and the Patent Application entitled "System for Configuration of Dynamic Computing Environments Using a Visual Interface" Ser. No. 09/662,990 filed on Sep. 15, 2000, page no. 1-23, FIGS. 1-2.

Computing device 314 can be any device compatible with the dynamic computing environment. In a specific embodiment, computing device 314 can be any computing device with a network card. In one embodiment, the network card would be enabled for remote booting and have a pre-boot execution environment. A pre-boot execution environment enables a computer to run a program before an operating system has been installed on the computer. For example, the pre-boot execution environment can be used to install an operating system. However, in a specific embodiment, the network card requirements can be relaxed. For example, the requirements of having a network card enabled for remote booting and having a pre-boot execution environment can be eliminated. In this case, as long as a network card is available in the computer, software can be installed on the computer that can act as a local agent for the script 318. In other words, a daemon installed on the computer will act as a local agent for the script 318 and take the place of a pre-boot execution environment or enable a network card for remote booting.

Server 316 can be a DHCP ("Dynamic Host Configuration Protocol") server; however, server 316 can be any server capable of running a script and storing computer specific information relating to the dynamic computing environment such as the computing devices' IP addresses. Server 316 also includes internal tables that can store the IP addresses of the computing devices in the dynamic computing environment.

Script 318 is a software process that can initiate various administrative actions, such as retrieving information about a new computing device, assigning a new IP address, adding the new IP address to an entry in the server 316, setting up the new computing device, rebooting the new computer device, etc.

The user interface 312 is located remotely from the computing device 314, server 316, and script 318. Additionally, user interface 312 can communicate with a computing device 314, which in turn interacts with a server 316 and script 318. Also, script 318 can be located on server 316 or remotely from server 316.

In one embodiment, computing device 314 is physically connected to the same local network as the dynamic computing environment that enables remote administration. However, in an alternative embodiment, the computing device 314 can be located in a network located remotely from the local network of a dynamic computing environment. In this alternative embodiment, the computing device is connected to the dynamic computing environment through a communication channel. For example, a proxy server can be located in the same remote network as that of the computing device 314. The proxy server can then forward all the requests and communications of computing device 314 to server 316, which will act as if the remote computing device 314 is part of its local network. In the specific embodiment of server 316 being a DHCP server, the proxy server can be a standard BOOTstrap Protocol ("BOOTP") relay agent. Additionally, any computing device capable of communicating through a TCP/IP ("Transmission Control Protocol/Internet Protocol") stack can connect to the dynamic computing environment through a modem. A local agent daemon residing on the computer can "telnet" through the modem to connect to server 316. This will achieve the same effect as a pre-boot execution environment of a network card and allow server 316 to act as if the remote computing device 314 is part of its local network.

By remotely connecting a computing device to the dynamic computing environment through a communication channel, scalability of the environment is enabled. The computing environment can then add new computing devices without the restriction of the computing devices being located on the same local network. Thus, the issue of finding space to hold all the computing devices can be addressed. By having the computing devices remotely located from the dynamic computing environment, the need for a remote management tool becomes even greater.

A method illustrating the remote administration of a dynamic computing environment will now be described. As shown in FIG. 3, the steps in the method progress in time from top to bottom. When a user selects an administrative action to be performed on one or more computing devices, that instruction is sent to each of the computing devices selected. For clarity purposes, the method will now be described in relation to one of the selected computing devices. However, it should be understood that each computing device selected will go through the same process.

A user, located in a remote location from a dynamic computing environment, can first select an administrative action to be performed on a computing device from a user interface containing a list of administrative actions and a list of computing devices. A signal is then sent containing the selected computing device and administrative action. When the computing device 314 receives the signal, the computing device 314 can reboot and locate server 316. However, this step is not necessary and computing device 314 can just locate server 316 without rebooting. Once server 316 is located, script 318 is executed by server 316. The script 318 then assigns an IP address for the computer, retrieves the new machine information, such as the IP address and the MAC address, updates the internal tables of the server 316 with the new information, and then initiates a first administrative action on computing device 314 that is now recognized by server 316 through the new IP address. In a specific embodiment, the first administrative action includes rebooting the machine. The computing device 314 has now become "initialized" or "re-initialized" as part of the dynamic computing environment. If the user had only selected to reboot the machine, the process, therefore, ends at this step.

However, additional administrative actions can be performed. In one embodiment, in order for the additional administrative actions to be performed, the above process is performed first. Therefore, even though some administrative actions require that the above process be performed first, the user would not have to specify that the first administrative action be performed. The script would recognize that the selected administrative action would require that the first administrative step be performed. In a specific embodiment, the required first administrative step would include re-booting the computing device.

Thus, the process will continue with computing device 314 locating server 316 again. Server 316 would then check the computing device's IP address to verify the identity of the computing device 314 and run script 318. The script 318 would then perform the additional administrative actions specified by the user. In a specific embodiment, the additional administrative actions can include installing or re-installing an operating system, changing the operating system and/or file system, configuring the computing device to be part of the dynamic computing environment, dynamically adding applications to the computing device, provisioning new software dynamically, etc. Additionally, the computing device 314 can be rebooted again.

In a specific embodiment of remotely installing an operating system, the pre-boot execution environment of the computing device 314 is used to communicate with server 316 to remotely install an operating system in the computing device 314. In one embodiment, the computing device 314 is physically connected to the same local network as the dynamic computing environment. First, the computing device 314 is initiated as part of the dynamic computing environment using the first set of steps. Then, using the second set of steps, a signal is sent to the computing device 314 to remotely install the operating system in the computing device 314. In the second set of steps, the computing device 314 first locates the server 316, which checks the internal tables for the computing device 314's IP address. If found, the server 316 runs the script 318, which sets up the new machine by installing the O/S using the pre-boot execution environment of the network card to remotely install the O/S from storage. In one embodiment, the installation of the O/S can be performed by first locating the requested copy of the O/S based on the name, type, vendor, version, etc. in storage. For example, a RedHat Linux 6.2 Server operating system could be retrieved. The located O/S is then copied from storage to local storage and uncompressed if needed. The initiation script 318 then prompts the computing device 314 to boot from the copied O/S. Thus, the computing device 314 has become a part of the dynamic computing environment and an operating system has been remotely installed on the computing device 314.

In another embodiment, the computing device 314 does not have to be physically connected to the local network of the dynamic computing environment. The above actions can be accomplished by using a modem connection and TCP/IP stack software on the computing device 314 to remotely pull the operating system software and install it locally.

In a specific embodiment of remotely installing an operating system, some restrictions on remote installations can be overcome. For instance, some operating systems can be remotely installed without restrictions, whereas some operating systems require a local file system of a specific kind to be present on the computing device. Therefore, these operating systems cannot be installed remotely if the required file system is not present locally. To overcome this problem, an operating system can be first installed that does not have any restrictions on remote installation. The computing device's disk can then be partitioned with the file system compatible with the desired operating system. Then, the existing system's loader can be used to load the desired operating system after pulling the operating system from remote storage, if needed. Therefore, the chaining or multiple loading of operating systems can be used to get around any restrictions that would otherwise prevent remote installations. As long as the operating systems satisfy the requirements needed for a remote installation, the remote installation of any desired operating system can be achieved by chaining any number of operating systems of any kind.

In a specific embodiment of remotely powering on/off a computing device, a hardware switch, called a 'remote power control switch', can be connected in between the user (or the user interface) and the computing device. One or more of the new computing devices may then be connected to the switch instead of to a power source. When the user issues a 'power-on' request, the switch turns on the power for the specific device and then in turn issues a request to the computing device, which proceeds as described above for the first administrative action. In a specific embodiment, the request can be for a reboot. When a 'power-down' request is received, the switch in turn issues a shut-down operation and then turns the power off for the device.

The above operations are enabled without imposing specific requirements on the individual user computers in terms of the computer's hardware, operation systems, or network components. Additionally, multiple modes of operations that are flexible enough to accommodate hardware and software from a multitude of vendors are enabled. Thus, if a particular vendor does not enable a mode, then another mode can be used. For example, if vendor X sells computers with network cards that do not have a pre-boot execution environment (PXE), and vendor Y sells computers with network cards that have a PXE, computing devices from both vendors can coexist in the same DCE and can be remotely administered seamlessly. This would not be possible without multiple modes of operation. Also, because of the system's multiple modes of operations, the solution is tolerant of faults in some of the components of the computer or of the computing environment.

Computing devices in the DCE can be set up so an administrative action can be performed in alternative ways. For example, computing devices can be administered through a network-card with PXE, any network card and daemon software, or with a modem and TCP/IP stack. A computing device containing a network-card with PXE, a modem and the TCP/IP software stack, and a network card and the daemon software use in any one of the above three modes for remote administration. In another example, because server 316 can be a DHCP server and be local or remote, a network that includes both a DHCP server and a proxy server that can communicate with a remote DHCP server can now be operated where any computing device can contact the local DHCP server or the proxy server. Thus, if either the DHCP server or proxy server fails, the other server can be contacted providing an alternative mode of operation. The DCE can use a combination of the above modes so that remote administration can still be achieved in the event of failures, such as if a DHCP server or network card fails. Thus, the invention is tolerant of local failures, i.e, the failure of one component in a computing device or the failure of one server in a DCE network.

Additionally, the service can co-exist with other system-specific remote administration tools because a user computer independent of the hardware and operating system does not disable or preclude using other administration tools. Furthermore, the system is enabled through a single user interface that reduces the need for an administrator to learn more than one tool for handling different kinds of hardware or operations systems.

Figure 4:
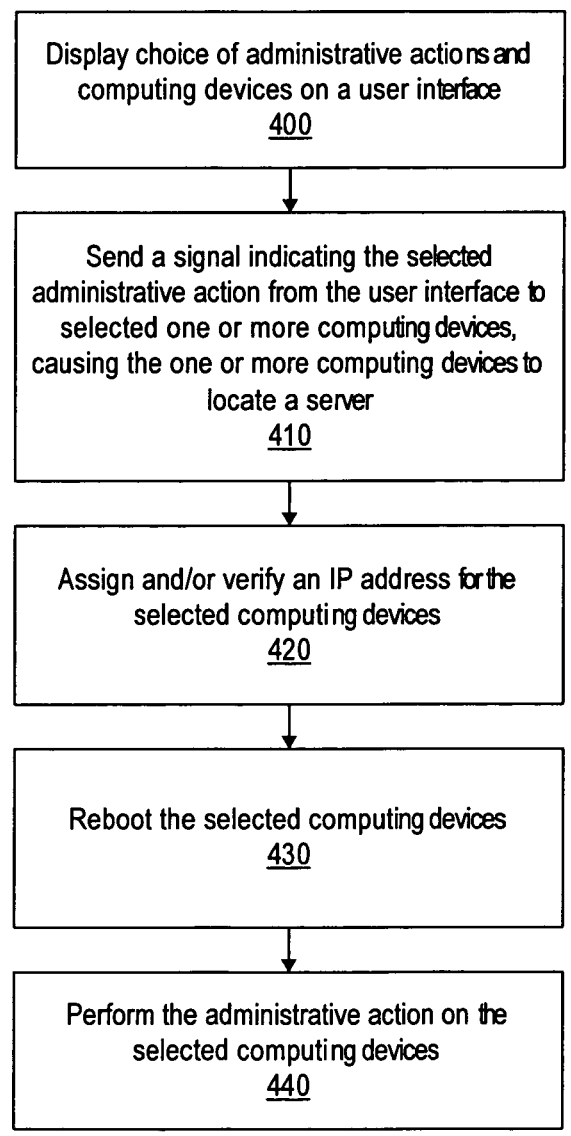
FIG. 4 is a flowchart of a method of remotely administering one or more computing environments according to one embodiment of the invention.

FIG. 4 is a flowchart of one embodiment of a method of remotely administering one or more computing environments. The method begins at 400, when a choice of administrative actions and computing devices is displayed on a user interface. At 410, a signal, which indicates the selected administrative action, is sent from the user interface to selected one or more computing devices, causing the one or more computing devices to locate a server.

Functions 420 and 430 are used to initialize the selected computing devices, in this embodiment. At 420, an IP address is assigned to and/or verified for the selected computing devices. At 430, the selected computing devices are rebooted. At 440, the administrative action is performed on the selected computing devices.

Figure 5:
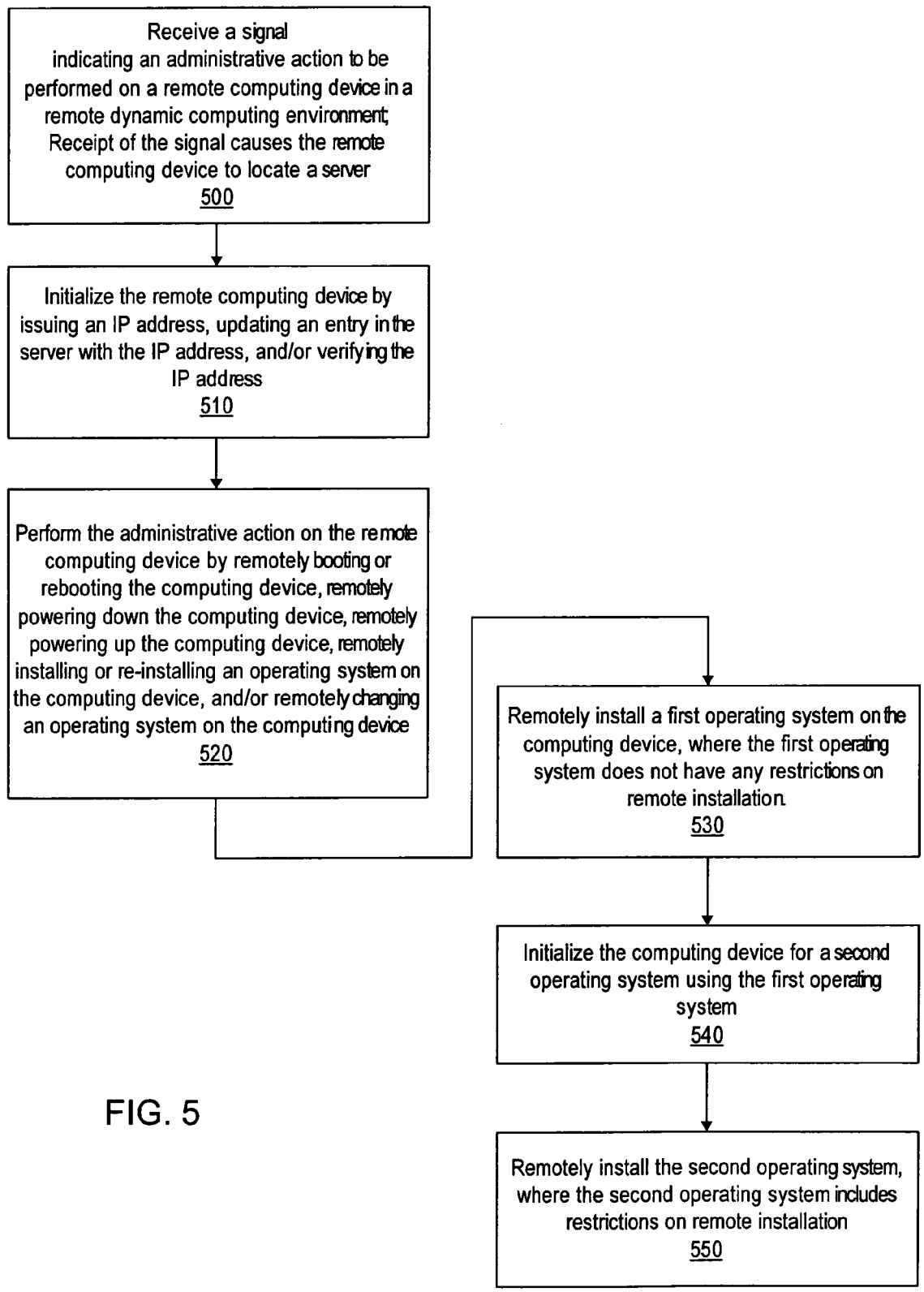
FIG. 5 is another flowchart of a method of administering a remote computing environment according to one embodiment of the invention.

FIG. 5 is another flowchart of a method of administering a remote computing environment, according to one embodiment of the invention. The method begins at 500, when a signal, which indicates an administrative action to be performed on a remote computing device in a remote dynamic computing environment, is received by the remote computing device. Receipt of the signal causes the remote computing device to locate a server.

In response to the remote computing device locating the server, the remote computing device is initialized by issuing an IP address, updating an entry in the server with the IP address, and/or verifying the IP address, as shown at 510. Examples of administrative actions that can then be performed on the remote computing device are shown at 520, 530, 540, and 550.

The administrative action performed at 520 can involve remotely booting or rebooting the computing device, remotely powering down the computing device, remotely powering up the computing device, remotely installing or re-installing an operating system on the computing device, and/or remotely changing an operating system on the computing device.

The administrative action performed at 530 involves remotely installing a first operating system on the remote computing device. The first operating system does not have any restrictions on remote installation. After the first operating system is installed, the remote computing device is initialized for a second operating system using the first operating system, as shown at 540. Then, at 550, the second operating system is remotely installed. The second operating system includes restrictions on remote installation.

The above description is illustrated but not restricted. Many variations of the invention will become apparent to those skilled in the art upon review of the disclosure. The scope of the invention should, therefore, be determined not with reference to the above description, but instead should be determined with reference to the pending claims along with their full scope or equivalence.

What is claimed is:

1. A hardware system for administering a remote dynamic computing environment comprising:
    a computer system coupled to communicate with the remote dynamic computing environment by the Internet, wherein the computer system is configured to display a web page on the computer system to a user, wherein the web page comprises a list of administrative actions and a list of computing devices in the remote dynamic computing environment, and wherein the computer system is different than the computing devices;

one or more computing devices in the list of computing devices responsive to a signal indicating an administrative action in the list of administrative actions, wherein the signal is provided from the computer system to the one or more computing devices via the Internet, in response to selection of the one or more computing devices and the administrative action via the web page;

a server configured to initialize the one or more computing devices in the remote computing environment, in response to the one or more computing devices locating the server, wherein the server is not part of the dynamic computing environment, wherein receipt of the signal causes each of the one or more computing devices to locate the server, wherein initializing the one or more computing devices comprises adding the one or more computing devices to the remote dynamic computing environment, wherein the server is part of a different local network than the computer system, wherein the server is a different system than the computer system; and a software process configured to initiate the administrative action on the one or more computing devices.

2. The system of claim 1, wherein the server is located in a local network of the remote dynamic computing environment.

3. The system of claim 2, wherein the one or more computing devices are located on a remote network from the local network of the remote dynamic computing environment.

4. The system of claim 3, further comprising:

a proxy server, wherein the proxy server is located on the remote network, along with the one or more computing devices, wherein the server located on the local network of the remote dynamic computing environment is configured to receive requests from the proxy server.

5. The system of claim 3, wherein the one or more computing devices are configured to connect to the local network of the remote dynamic computing environment through a TCP/IP connection.

6. The system of claim 2, wherein the one or more computing devices are connected to the local network of the remote dynamic computing environment.

7. The system of claim 1, wherein the one or more computing devices each include a network card, wherein the network card is configured to enable remote booting and includes a pre-boot execution environment.

8. The system of claim 1, wherein the one or more computing devices each include a network card and an application that can replace a pre-boot execution environment, wherein the application is configured to enable remote booting of the one or more computing devices.

9. A method, implemented on computing hardware, for administering a remote dynamic computing environment using a web page, the method comprising:

displaying choices of a plurality of administrative actions and a plurality of computing devices on the web page, wherein the web page is displayed on a computer system, and wherein the computer system is different than the computing devices;

sending one or more signals from the computer system via the Internet, wherein the one or more signals indicate the selection of an administrative action of the plurality of administrative actions to be performed on selected one or more computing devices of the plurality of computing devices in the remote computing environment, wherein the one or more signals are sent to the one or more computing devices and receipt of the one or more signals causes the one or more computing devices to locate a server that is not part of the dynamic computing environment and causes the server to initialize the one or more computing devices, wherein initializing the one or more computing devices comprises adding the one or more computing devices to the remote dynamic computing environment, wherein the server is part of a different local network than the computer system, wherein the server is a different system than the computer system; and performing the administrative action on the one or more computing devices, in response to the one or more computing devices locating the server.

10. The method of claim 9, wherein the performing the administrative action comprises initializing the one or more computing devices.

11. The method of claim 10, further comprising the one or more computing devices locating the server again, in response to being initialized.

12. The method of claim 11, further comprising performing an additional administrative action on the one or more computing devices, in response to the one or more computing devices locating the server again.

13. The method of claim 9, further comprising the steps of:

assigning an IP address for the one or more computing devices;

updating an entry in the server with the IP address; and rebooting the one or more computing devices.

14. The method of claim 13 further comprising the steps of:

verifying the IP address for the one or more computing devices.

15. The method of claim 9, wherein the step of performing the administrative action comprises performing a plurality of administrative actions on the one or more computing devices.

16. The method of claim 9, wherein the one or more signals are provided to each of a plurality of computing devices.

17. The method of claim 9, wherein resources allocated to the dynamic computing environment are automatically de-allocated in response to detecting that a time period has expired.

18. The method of claim 9, wherein the one or more computing devices is enabled to execute software prior to installation of an operating system by virtue of including at least one of a network card that comprises a pre-boot execution environment and an installed daemon configured to substitute for the pre-boot execution environment.

19. A method, implemented on computing hardware, for performing an administrative action on a remote computing device in a remote dynamic computing environment, the method comprising:

receiving a signal, sent via the Internet by a computer system, at the remote computing device, wherein the server is not part of the dynamic computing environment, wherein the signal indicates the administrative action to be performed on the remote computing device and receipt of the signal causes the remote computing device to locate a server configured to initialize the remote computing device, wherein the signal is generated in response to a user interacting with a web page displayed by the computer system, and wherein the computer system is not part of a same local network as the server, wherein the server is a different system than the computer system, and wherein the computer system is different than the remote computing device;

initializing the remote computing device in the remote dynamic computing environment, in response to the remote computing device locating the server, wherein initializing the one or more computing devices comprises adding the one or more computing devices to the remote dynamic computing environment; and performing the administrative action on the remote computing device.

20. The method of claim 19, wherein initializing the remote computing device comprises issuing an IP address for the remote computing device.

21. The method of claim 20, wherein initializing the remote computing device comprises updating an entry in the server with the IP address.

22. The method of claim 20, wherein initializing the remote computing device comprises verifying the IP address of the remote computing device.

23. The method of claim 19, wherein performing the administrative action comprises remotely rebooting the remote computing device.

24. The method of claim 19, wherein performing the administrative action comprises remotely powering down the remote computing device.

25. The method of claim 19, wherein performing the administrative action comprises remotely powering up the remote computing device.

26. The method of claim 19, wherein performing the administrative action comprises remotely booting the remote computing device.

27. The method of claim 19, wherein performing the administrative action comprises remotely installing an operating system on the remote computing device.

28. The method of claim 19, wherein performing the administrative action comprises remotely changing an operating system on the remote computing device.

29. The method of claim 19, wherein performing the administrative action comprises remotely re-installing an operating system on the remote computing device.

30. The method of claim 19, wherein performing the administrative action comprises:

remotely installing a first operating system on the remote computing device, wherein the first operating system does not have any restrictions on remote installation;

initializing the remote computing device for a second operating system using the first operating system; and remotely installing the second operating system, where the second operating system includes restrictions on remote installation.

31. The method of claim 19, wherein performing the administrative action comprises using a switch connected to the remote computing device to remotely power down the remote computing device.

32. A computer program product comprising:

a computer-readable hardware storage medium including instructions executable to perform an administrative action on a remote computing device in a remote dynamic computing environment, the instructions comprising:

one or more instructions for receiving a signal, sent via the Internet by a computer system, at the remote computing device, wherein the signal indicates the administrative action to be performed on the remote computing device and receipt of the signal causes the remote computing device to locate a server configured to initialize the remote computing device, wherein the server is not part of the dynamic computing environment, wherein initializing the one or more computing devices comprises adding the one or more computing devices to the remote dynamic computing environment, wherein the signal is generated in response to a user interacting with a web page displayed by the computer system, and wherein the computer system is not part of a same local network as the server, wherein the server is a different system than the computer system, and wherein the computer system is different than the remote computing device;

one or more instructions for initializing the remote computing device to be part of the remote dynamic computing environment, in response to the remote computing device locating the server; and one or more instructions for performing the administrative action on the remote computing device.

\* \* \* \* \*